M. L. PARRETT.
HARVESTER.
No. 172,050. Patented Jan. 11, 1876.
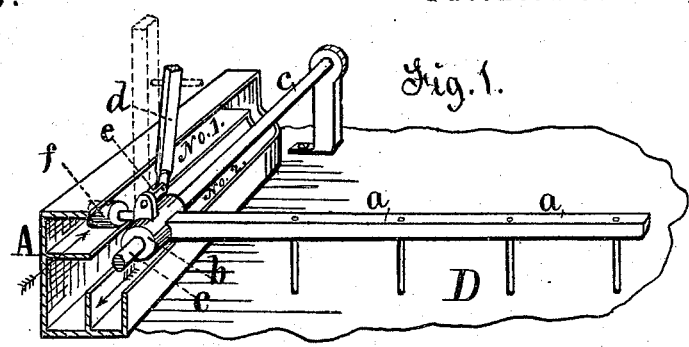
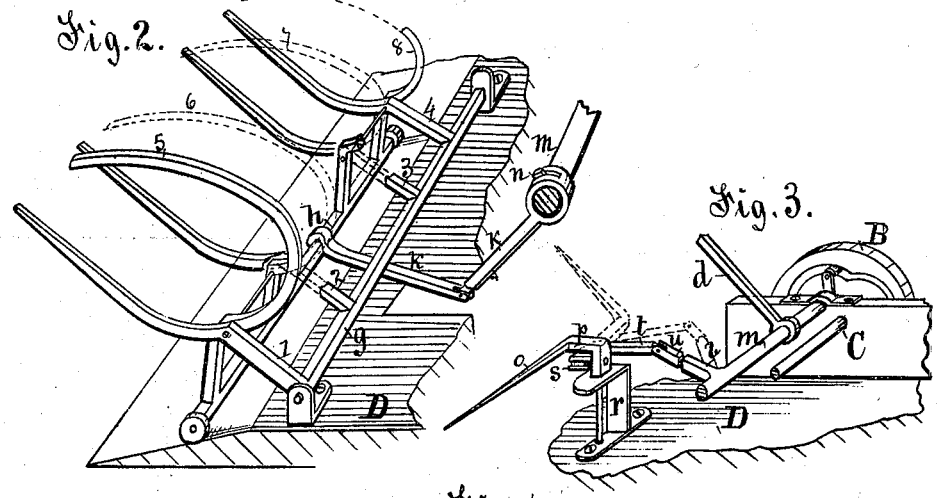
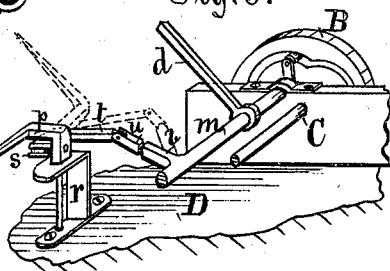
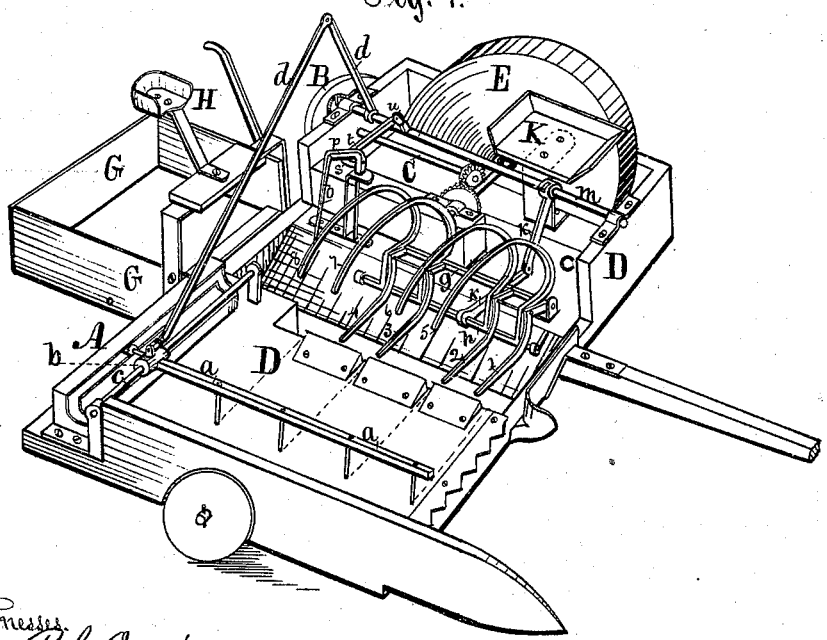
Witnesses:
R. G. Orwig
Arthur Wright
Inventor,
Milton L. Parrett
Attorney, Thomas G. Orwig

UNITED STATES PATENT OFFICE.

MILTON L. PARRETT, OF MARSHALLTOWN, IOWA.

IMPROVEMENT IN HARVESTERS.

Specification forming part of Letters Patent No. 172,050, dated January 11, 1876; application filed March 1, 1875.

*To all whom it may concern:*

Be it known that I, MILTON L. PARRETT, of Marshalltown, in the county of Marshall and State of Iowa, have invented certain Improvements for Harvesters, of which the following is a specification:

The object of my invention is to construct a harvesting-machine in such a manner that the cut grain will be automatically raked into and held by a gavel-holder for the binder, and, when bound, automatically delivered to a bundle-carrier. It consists in a rake, a gavel-holder, and a fork, formed, combined, and arranged relative to each other and the binder's and driver's seats, and a bundle-carrier, all as hereinafter fully set forth.

Figure 1 of my drawing is a perspective view, illustrating the manner of forming and mounting the rake. $a$ is the rake, rigidly attached to the hub $b$. $c$ is a fixed shaft, upon which the hub $b$ turns and slides. $d$ is a pitman, connected with the hub $b$ by means of the swiveled joint $e$. $f$ is an anti-friction roller, journaled to the hub $b$ on the opposite side of the rake $a$, and in line therewith. A A represent a section of a rake-guide, in the form of a grooved box running parallel with the shaft $c$. It is rigidly attached to the rear side of the harvester-body in any suitable manner. No. 1 is the elevated and rear portion of a continuous groove, in which the roller $f$ moves when the rake $a$ is sweeping the grain-platform and gathering a gavel. No. 2 is the lower and front portion of the same continuous groove, in which the roller $f$ moves when the rake assumes a vertical position, as indicated by broken lines, and as required when it returns to make a successive sweep of the platform and to gather a second gavel.

Fig. 2 is a perspective view, illustrating the construction and operation of my gavel-holder. 1 2 3 4 are bent arms, rigidly attached to the rock-shaft $g$, designed to be mounted upon the platform of the harvester. 5 6 7 8 are hook-form arms, rigid on the bar $h$ at their lower ends, and pivoted to the arms 1 2 3 4 at the points where they cross each other. $k\ k$ is a jointed pitman, hinged to the bar $h$ and a rock-shaft, $m$, designed to be mounted on the harvester and combined with the driving mechanism. $n$ is a cam on the rock-shaft $m$, projecting through a slot in the end and bearing of the pitman $k$.

Fig. 3 is a pivoted fork, designed to enter the gavel-holder and to be bound in the sheaf, and then swing around and carry and deposit the bound sheaf in a bundle-carrier. $o$ is the tine of the fork; $p$, its crooked shank; $r$, its bearing, designed to be rigidly attached to the harvester-platform. $s$ is a swivel journaled to the shank $p$, and hinged to a bent pitman, $t$. $u$ is a swivel, pivoted to the crank $v$ on the rock-shaft $m$, and hinged to the pitman $t$. $m$ is the rock-shaft, designed to be mounted on the harvester and actuated by the grooved cam-wheel B. C is the rigid axle of the cam-wheel B. It has a bevel-gear wheel on its end, designed to engage a corresponding bevel-gear wheel rigidly fixed on the axle of the driving-wheel.

Fig. 4 is a perspective view of my complete harvester, showing the relative positions of the various parts and their co-operation. D D represent the frame and body of the harvester. E is the driving-wheel, mounted on suitable bearings attached to the frame. G G is a dumping bundle-carrier, secured to the rear and central portion of the body D D. H is the driver's seat, mounted over the bundle-carrier G in any suitable way, and in such position relative to the bundle-carrier that the driver can readily dump the bundles, whenever desired, by pulling a lever. K is the binder's seat, mounted in any suitable way inside of the driving-wheel E, and faces inward, and is in such position relative to the gavel-holder that the occupant can readily reach around and bind the gavel in the holder.

In the practical operation of my harvester, the driving-wheel E, connected by bevel-gear wheels with the shaft C, actuates the grooved cam-wheel B to rock the shaft $m$, and thereby alternately lengthens and shortens the jointed pitman $d\ d$, to move the rake $a$ and cause it to sweep the grain-platform, and gather and deliver a gavel to the arms 1 2 3 4 of the gavel-holder. The same motion of the rock-shaft $m$ and its cam $n$ in the slotted bearing of the pitman $k\ k$ will alternately lengthen and shorten the pitman, and cause it to rock the shaft $g$ and close the upper and lower series of arms, to press the gavel, and at the same time elevate it into a convenient position for the binder to pass a band around the gavel and bind it. A band of straw, cord, or any other suitable material may be used. The same rocking motion of the shaft m also operates the fork o p, and, by means of the swiveled pitman t, causes the tine o to enter the gavel-holder simultaneously with the gavel, and to remain there until the gavel-holder opens, when it swings around toward the rear and carries the bound sheaf to the bundle-carrier G G, where the sheaves may accumulate, to be dropped at the will of the driver.

I am aware that rakes, gavel-holders, and bundle-carriers similar to mine have been used, and that cut grain has been taken from the sickle and deposited from the machine in bound sheaves, but not without being lifted and handled by the manual labor of the binder; and I claim that my combination of elements, by means of which the cut grain is automatically taken from the sickle and delivered in bound sheaves to the bundle-carrier without being lifted by the binder, is distinctively new and greatly advantageous.

I claim as my invention—

1. The gavel-holder composed of the rock-shaft g, bar h, and the double series of bent arms 1 2 3 4 5 6 7 8, in combination with the jointed pitman k k and rock-shaft m, having cam n, substantially as and for the purposes shown and described.

2. The pivoted fork o p, having swivel s, in combination with the bent pitman t, swivel u, crank v, and rock-shaft m, and gavel-holder g h, substantially as and for the purposes shown and set forth.

3. In a harvesting-machine, the rake a, the gavel holder and carrier g h, the pivoted fork o p, and the bundle-carrier G, when arranged and combined relatively to each other and the binder's seat K, substantially as described, to take the cut grain from the sickle and deposit it in bound sheaves.

MILTON L. PARRETT.

Witnesses:
W. B. PARRETT,
C. M. KELLOGG.